US010683407B2

(12) United States Patent
Thieblemont

(10) Patent No.: US 10,683,407 B2
(45) Date of Patent: Jun. 16, 2020

(54) PROCESS FOR PREPARING POLYAMIDE GRANULES AND USES

(71) Applicant: PolyTechnyl, SAS, Paris (FR)

(72) Inventor: Virginie Thieblemont, Millery (FR)

(73) Assignee: PolyTechnyl, SAS, Paris (FR)

( * ) Notice: Subject to any disclaimer, the term of this patent is extended or adjusted under 35 U.S.C. 154(b) by 1214 days.

(21) Appl. No.: 14/363,595

(22) PCT Filed: Dec. 5, 2012

(86) PCT No.: PCT/EP2012/074408
§ 371 (c)(1),
(2) Date: Jun. 6, 2014

(87) PCT Pub. No.: WO2013/087464
PCT Pub. Date: Jun. 20, 2013

(65) Prior Publication Data
US 2014/0349046 A1 Nov. 27, 2014

(30) Foreign Application Priority Data

Dec. 15, 2011 (FR) ...................................... 11 61680

(51) Int. Cl.
C08K 3/00 (2018.01)
C08J 7/06 (2006.01)
B60C 9/00 (2006.01)
C08K 3/014 (2018.01)
C08J 7/02 (2006.01)
B29B 9/16 (2006.01)
C08K 3/16 (2006.01)
B29D 99/00 (2010.01)
B29L 31/00 (2006.01)

(52) U.S. Cl.
CPC .................. C08J 7/065 (2013.01); B29B 9/16 (2013.01); B60C 9/0042 (2013.01); C08J 7/02 (2013.01); C08K 3/014 (2018.01); C08K 3/16 (2013.01); *B29B 2009/163* (2013.01); *B29D 99/0078* (2013.01); *B29L 2031/731* (2013.01); *C08J 2377/00* (2013.01); *C08J 2377/06* (2013.01); *Y10T 428/1345* (2015.01); *Y10T 442/3984* (2015.04)

(58) Field of Classification Search
CPC ..... C08J 7/00; C08J 2377/00; B29L 2031/00; C08K 3/00; B29D 99/00; B29B 9/00; B29B 2009/00
See application file for complete search history.

(56) References Cited

U.S. PATENT DOCUMENTS

| 3,359,235 | A | * | 12/1967 | Brignac | ................... | C08K 5/43 |
| | | | | | | 524/168 |
| 4,213,884 | A | | 7/1980 | Eckell et al. | | |
| 4,442,260 | A | | 4/1984 | Larsen | | |
| 4,745,006 | A | * | 5/1988 | Mohajer | ................ | C08J 3/2053 |
| | | | | | | 427/213.36 |
| 5,059,103 | A | | 10/1991 | Bruckmann et al. | | |
| 5,180,402 | A | * | 1/1993 | Kubota | ................... | D01F 1/103 |
| | | | | | | 428/323 |
| 5,234,644 | A | * | 8/1993 | Schutze | ................... | D01F 6/60 |
| | | | | | | 264/101 |
| 5,254,633 | A | * | 10/1993 | Han | ................... | C08G 73/0266 |
| | | | | | | 427/121 |
| 5,306,804 | A | | 4/1994 | Liehr et al. | | |
| 5,432,254 | A | | 7/1995 | Liehr et al. | | |
| 7,767,782 | B2 | * | 8/2010 | Crombach | ............ | C08G 69/04 |
| | | | | | | 528/310 |
| 2003/0050376 | A1 | * | 3/2003 | Oka | ...................... | C04B 41/009 |
| | | | | | | 524/413 |
| 2010/0168375 | A1 | | 7/2010 | Thierry | | |
| 2012/0046438 | A1 | | 2/2012 | Thieblemont et al. | | |
| 2014/0349046 | A1 | | 11/2014 | Thieblemont | | |

FOREIGN PATENT DOCUMENTS

| FR | 2916756 B1 | 7/2009 |
| FR | 2984332 A1 | 12/2011 |
| JP | 48052846 A | 11/1971 |
| JP | 49034550 A2 | 3/1974 |
| JP | 49037704 B4 | 10/1974 |
| JP | 59027949 A * | 2/1984 |
| JP | 8325382 A2 | 12/1992 |
| JP | 6184302 A2 | 7/1994 |
| JP | 6256649 A2 | 9/1994 |
| JP | 11158743 A2 | 6/1999 |
| JP | 2002241606 A2 | 8/2002 |
| JP | 2003055549 A2 | 2/2003 |

(Continued)

OTHER PUBLICATIONS

JP,59-027949,A, English translation.*
English Translated "JP 48-052846" Kaichi Munechika, 1973.*
Reimelt, Mixers, 2010—www.reimelt-henschel.de—Druckversion (2 pages).
Ava-Huet, Plastics and Elastomeres, Coating of plastic granules, 2008.

*Primary Examiner* — Gordon Baldwin
*Assistant Examiner* — Mohammad Mayy
(74) *Attorney, Agent, or Firm* — Osha Liang LLP

(57) ABSTRACT

The subject matter of the present invention is a process for preparing polyamide granules having heat-resistance properties, and also the use of these granules, in particular in the aid of the manufacture of yarns for airbags or for tyre cords. More specifically, the invention relates to a process for preparing polyamide granules having heat-resistance properties by wet impregnation of the granules with an aqueous solution comprising at least one heat stabilizer.

11 Claims, No Drawings

(56) References Cited

FOREIGN PATENT DOCUMENTS

| | | |
|---|---|---|
| JP | 2004231807 A2 | 8/2004 |
| JP | 2008285767 A2 | 11/2008 |
| JP | 2010047036 A2 | 3/2010 |
| JP | 2010185028 A2 | 8/2010 |
| WO | WO 2010105939 A1 | 9/2010 |

\* cited by examiner

PROCESS FOR PREPARING POLYAMIDE GRANULES AND USES

This application is a U.S. national stage entry under 35 U.S.C. § 371 of International Application No. PCT/EP2012/074408, filed Dec. 5, 2012, which claims priority to French Application No. 1161680 filed on Dec. 15, 2011. The entire content of each of these applications is hereby incorporated herein.

The present invention relates to a process for preparing polyamide granules, which gives the polyamide heat resistance properties, and also to the use of these granules, especially in the field of manufacturing industrial yarns for airbags or for tire cords.

More precisely, the invention relates to a process for preparing polyamide granules with heat resistance properties, by wet impregnation of the polyamide granules with an aqueous solution comprising a heat stabilizer.

In the field of industrial yarns, i.e. yarns intended generally for making cord fabrics for tires or for airbags, the use of polyamides is widespread. Such polyamide yarns must be heat-resistant, and, for this, it is known practice to use one or more heat stabilizers.

The usual heat stabilizers are generally copper compounds, especially copper salts (acetate, iodide, bromide, etc.), often combined with mineral halides such as potassium or sodium halides, these halides having the role of regenerating the copper in situ.

However, the "tire cord" and "airbag" applications have different specificities in terms of homogeneity of the polymer matrix.

Specifically, airbag yarns must have a finer yarn count than yarns intended for making tire cords. The fine yarn count stipulation means that the polymer matrix must be perfectly homogeneous so as not to break during spinning.

In addition, the yarns thus obtained must not have any defects that might lead to them breaking, or any appearance defects, so as not to lead to any degradation of the performance of the implementation processes (e.g. weaving crafts) and thus be totally reliable in their application.

At the present time, several processes for supplementing with stabilizers are known. Essentially three supplementation techniques are known: during polymerization, in the polyamide melt before granulation or just before the spinning step, and also on the granules, for example before a step of solid-phase post-condensation of the same.

Supplementation with three solutions of heat stabilizer: copper acetate, potassium iodide and potassium bromide, during the polymerization of polyamide 66 is used for the manufacture of industrial yarns.

However, it is known that the copper compounds added during the polymerization undergo a reduction, which forms deposits in the machines (above all in the unstirred reactors). Such a phenomenon has the consequence of necessitating frequent cleaning of the machines and thus gives rise to a loss of productivity of the installations. In addition, the detachment of these deposits causes problems of lack of homogeneity of the matrix, which has a negative impact on the spinning.

Furthermore, the presence of potassium bromide may, under certain conditions, lead to machine corrosion problems.

In addition, supplementation during polymerization limits the flexibility of the corresponding industrial processes due to the costs associated with the changes in quality of polymers manufactured in the same installation (cleaning time, labor cost, inferior-grade product during the rinsing phase, etc.).

To overcome the abovementioned problems of supplementation during polymerization, industrialists have turned toward late supplementation by wet impregnation of the granules. The term "wet impregnation" means the supplementation of aqueous solutions of heat stabilizer onto polyamide granules.

Having said that, this type of supplementation of aqueous solutions onto polyamide granules, as is currently proposed, has a major drawback which arises from the use of a large amount of water via the aqueous solutions of heat stabilizer. Water, which serves as solvent for the heat stabilizer, wets the granules to coat them with heat stabilizer.

In the existing processes, a relatively large amount of water is needed in order to ensure the homogeneity of the supplementation (wetting of the granules).

This large amount of water also arises from the concern for dissolution of the stabilizers. It is moreover conventional to use at least two aqueous solutions to dissolve each of the stabilizers, for instance copper acetate, on the one hand, and potassium iodide or potassium bromide, on the other hand.

However, the use of such an amount of water brings about self-aggregation of the granules. As a result, the granules become difficult to handle and, once aggregated together, it is impossible to obtain homogeneous supplementation at their surface. The use of two solutions also poses problems of complexity of the machines, which must be equipped with two different feeds or which require a rinsing step between the two solutions in order to avoid the problems of precipitation of insoluble copper compounds, which is the cause of quality problems (pollution) and process exploitation problems (fouling).

Furthermore, the existing processes require the use of a drying step before solid-phase post-condensation. This drying step, which is currently essential, is expensive in energy terms.

In an attempt to solve this problem, JP2004-231807 proposes a process for the supplementation of an aqueous solution or dispersion of mineral halide in which the amount of water is reduced to a weight concentration relative to the weight of polyamide of between 2% and 6%. This amount of water is, admittedly, reduced, but this is insufficient to overcome the aggregation problems and the lack of homogeneity at the surface of the supplemented granules.

Thus, there is still a need to improve the processes for supplementing heat stabilizers by wet impregnation onto polyamide granules, especially via processes allowing homogeneous supplementation, which are simple to perform and which minimize the costs relating to a subsequent step of drying of the granules.

One of the aims of the present invention is therefore to propose a process for preparing polyamide granules that does not have the drawbacks of the prior art processes and that especially does not have the problem of granule aggregation, minimizing the work for the drying of the supplemented granules and allowing homogeneous supplementation of the heat stabilizer onto the surface of the granules. In addition, the process must be simple to perform, economical and satisfy the quality requirements both of polyamide yarns for the manufacture of airbag fabrics and of polyamide yarns for the manufacture of tire cord fabrics.

The invention satisfies this need by proposing a process for preparing polyamide granules to give the polyamide heat resistance properties, by wet impregnation of the polyamide granules with a single aqueous solution comprising at least one heat stabilizer, characterized in that the polyamide granules are placed in contact with a single aqueous solution comprising at least one heat stabilizer, the total amount of aqueous solution relative to the polyamide being less than or equal to 1% by weight.

The invention is also directed toward the use of the polyamide granules thus obtained for the manufacture of industrial yarns, and the industrial yarns thus obtained.

Other subjects of the invention are articles obtained from the industrial yarns according to the invention, especially woven articles such as airbag fabrics or tire cord fabrics.

The process according to the invention involves polyamide granules.

The polyamides are obtained either by reaction between two different monomers or by polycondensation of just one monomer.

The invention applies, firstly, to polyamides derived from two different monomers, the most important polyamide of which is poly(hexamethylene adipamide) or polyamide 66. Needless to say, these polyamides may be obtained from a mixture of diacids and of diamines. Thus, in the case of polyamide 66, the main monomers are hexamethylenediamine and adipic acid. However, these monomers may comprise up to 25 mol % of other diamine and/or diacid monomers and/or even amino acid and/or lactam monomers.

The invention applies, secondly, to polyamides resulting from just one monomer, the most important polyamide of which is polycaprolactam or polyamide 6. Needless to say, these polyamides may be obtained from a mixture of lactams and/or amino acids. Thus, in the case of polyamide 6, the main monomer is caprolactam. However, these monomers may comprise up to 25 mol % of other amino acid and/or lactam monomers and/or even diamine or diacid monomers.

The class of polyamides derived from two different monomers is generally manufactured using as starting material a salt obtained by mixing in stoichiometric amount a diacid with a diamine, generally in a solvent such as water.

Thus, in the manufacture of polyamide 66, adipic acid is mixed with hexamethylenediamine generally in water to obtain hexamethylenediammonium adipate, which is more commonly known as Nylon salt or "N Salt". The N salt solution is optionally concentrated by partial or total evaporation of the water.

The class of polyamides derived from a single monomer is generally manufactured using as starting material a lactam and/or an amino acid, and a small amount of water; the weight proportion of water is generally between 1% and 15%.

The polyamide is obtained by heating at high temperature and high pressure of an aqueous solution of the monomers (for example a solution of Nylon salt as described above), or of a liquid comprising the monomers, to evaporate the water while at the same time avoiding any formation at said phase so as to avoid the setting of the mixture to a solid. The polymerization step is continued up to the desired degree of polymerization.

The polycondensation processes are well known to those skilled in the art. They may be batchwise or continuous processes.

Additives may be introduced during the polymerization process. Examples of additives that may be mentioned include matting agents such as titanium dioxide, light stabilizers such as manganese acetate, catalysts such as phenylphosphonic acid or phenylphosphinic acid, antifoams, etc. These additives are known to those skilled in the art. This list does not have any exhaustive nature.

Preferably, the polyamide is chosen from polyamide 6, polyamide 11, polyamide 12, polyamide 4.6, polyamide 5.6, polyamide 6.6, polyamide 6.10, polyamide 6.12, polyamide 9.T polyamide 10.T and copolymers thereof. They may also be copolymers comprising units resulting from the use of diacid monomers such as isophthalic or terephthalic acid, or else of diamine monomers such as meta-xylylenediamine or para-xylylenediamine. Mention will be made, for example, of the 4.T, 6.T, 6.I, MXD.6 and PXD.6 units and the like.

According to a particularly advantageous mode of the invention, polyamide 6.6 is preferred.

The polyamide in melt form derived from the polymerization step is generally extruded and then put into form, especially into the form of granules.

For the purposes of the present invention, the term "granules" means that they are solid polyamide particles.

The granules that may be used in the process of the invention may be in various forms. They may be, for example, in cylindrical, spherical, elliptical, etc. form.

The polyamide granules are obtained by extrusion of a polyamide in melt form followed by a granulation step.

The step which consists in extruding the polyamide melt through a die is performed in a conventional manner known to those skilled in the art.

The die is generally placed at the outlet of a polymerization reactor, or at the outlet of a transfer line fed with molten polymer using a pump, or at the outlet of a kneading device which can generate a pressure greater than atmospheric pressure, generally an extruder.

At the die outlet, the polyamide is generally in the form of rods or strips, or directly in the form of granules in the case, for example, of underwater pelletizing.

The granulation step comprises cooling of the polyamide obtained after extrusion. Cooling of the material makes it possible especially to at least superficially set the latter.

The cooling devices suitable for such a step are known to those skilled in the art. This cooling device may consist of a cold water spraying device located close to the device of the die plate. It may also be a bath or a stream of water located close to or in contact with the device of the die plate into which the extruded polyamide is introduced. A water-trickling device may also be used.

The polyamide that is cooled is then cut in the form of granules. This cutting may also take place during or after the cooling step.

The cutting devices that are suitable for this step are known to those skilled in the art. The cutting device may be a milling cutter system with teeth; it may also be a system comprising knives and a knife block.

When the cooling liquid, generally water, is separated from the polymer rods or strips before cutting, the rods or strips are "dry" cut.

In the case where the cooling liquid, generally water, is separated from the polymer granules after cutting in the form of granules, the granules are generally also cooled with the cooling liquid before separating this liquid from the granules.

The cooling device may consist of a cold water spraying or circulation device located close to the device of the die plate. This is the case for the "pelletizing" granulators known to those skilled in the art. The cutting device and the die plate may also be positioned in a chamber filled with water; in this case, it is an "underwater pelletizing" granulator. Such "underwater pelletizing" granulating devices are, for example, described in U.S. Pat. No. 5,059,103.

The granulation may also be performed on a granulation platform, which generally comprises a device for guiding and cooling the extruded polyamide, a cutting device and a device for transferring to a separating device. These granulation platforms are known to a person skilled in the art.

The polyamide granules generally have a viscosity index (VI) of between 115 and 150 mL/g in formic acid at 90% by weight according to standard ISO 307, preferably between 125-140 mL/g in formic acid at 90% by weight according to standard ISO 307.

According to another characteristic of the invention, the end groups of the polyamide granules are sufficiently equilibrated so as not to limit the change in molar mass of the polymer during any solid-phase post-condensation step. They advantageously have a difference between the concentration of carboxylic and amine end groups $\Delta(GT)$ of between 0 and 35 meq./kg, as an absolute value.

The process for preparing polyamide granules having heat resistance properties according to the invention also involves a single aqueous solution comprising at least one heat stabilizer.

The heat stabilizer is advantageously a mixture of alkali metal or alkaline-earth metal halide and of copper halide. In this mixture, the heat-stabilizing role is played by the copper halide, the alkali metal or alkaline-earth metal halide itself serving to regenerate the oxidized copper. Preferably, the alkali metal halide is potassium or sodium iodide and the copper halide is copper iodide.

It is particularly preferred for the heat stabilizer to be a mixture of potassium iodide and copper iodide.

According to the invention, a rinsing step using a rinsing liquid, for example water, is preferably performed after placing the granules in contact with the aqueous solution.

According to the invention, the term "total amount of aqueous solution relative to the polyamide" means the sum of the amounts of aqueous solutions used, including the water originating from any rinsing step, this sum being less than or equal to 1% by weight.

Particularly advantageously, and in order to overcome any problem of deposition of the alkali metal or alkaline-earth metal bromide at the surface of the granules, the aqueous solutions used in the invention are free of alkali metal or alkaline-earth metal bromide, the alkali metal or alkaline-earth metal iodide then being chosen.

According to the invention, the total amount of aqueous solution relative to the polyamide is advantageously between 0.15% and 1% by weight, preferably between 0.20% and 1% by weight and even more preferentially between 0.3% and 0.9% by weight.

Beyond 1% by weight of aqueous solution relative to the polyamide, the amount of residual water penalizes the productivity of the subsequent granule-drying and/or post-condensation steps. At and above 2% by weight of aqueous solution relative to the polyamide, self-aggregation of the granules begins to be observed. At and above 3% by weight of aqueous solution relative to polyamide, the supplementation homogeneity degrades and the self-aggregation of the granules is very pronounced.

In the case where the heat stabilizer is a mixture of alkali metal or alkaline-earth metal halide and of copper halide, the ratio between the number of moles of halide and the number of moles of copper is then preferably greater than or equal to 7/1. Preferably, this ratio is greater than or equal to 10/1. The upper limit, for reasons of compromise between the desired heat stabilization properties and the economic constraints, is advantageously chosen to be less than or equal to 25/1 and preferably less than or equal to 15/1.

Moreover, the amount of heat stabilizer in the aqueous solution depends on the solubility limit of the heat stabilizer in this aqueous solution. Preferably, the amount of heat stabilizer in the aqueous solution is less than or equal to the solubility limit of the heat stabilizer. Thus, in the case where the heat stabilizer is a mixture of potassium iodide and copper iodide, then the copper iodide is advantageously present in an amount of less than or equal to 6% by weight in an aqueous solution of potassium iodide at about 50% by weight.

In the case where the heat stabilizer is a mixture of potassium bromide and copper bromide ($CuBr_2$), then the copper bromide is advantageously present in an amount of less than or equal to 15% by weight in an aqueous solution of potassium bromide at 30% by weight.

The placing in contact of the granules with the aqueous solution may be performed at room temperature (RT, about 20° C.) or at a higher temperature. The temperature in question is that of the granules. Preferably, the placing in contact should not be performed at a temperature above the boiling point (Tb) of the aqueous solution comprising the heat stabilizer.

Particularly advantageously, the placing in contact is performed at a temperature above the glass transition temperature (Tg) of the polyamide.

The temperature for the placing in contact is thus advantageously between room temperature and the boiling point of the aqueous solution comprising the heat stabilizer (from RT to Tb) and more preferentially between the glass transition temperature of the polyamide and the boiling point of the aqueous solution comprising the heat stabilizer (from Tg to Tb).

Preferably, for polyamide 66, the placing in contact takes place on granules whose temperature is between 20° C. and 100° C. and preferably between 80° C. and 95° C.

Generally, the placing in contact is performed in a chamber at atmospheric pressure.

According to a preferred variant of the process of the invention, the process of the invention is performed under a controlled atmosphere of inert gas. An atmosphere of rare gases, preferably argon, can be established, but it is more economical to make use of nitrogen.

The placing in contact of the polyamide granules with the aqueous solution comprising at least one heat stabilizer is advantageously performed by spraying of the aqueous solution.

The spraying is advantageously performed using a spraying nozzle of flat jet type which distributes the liquid uniformly in the form of a blade and provides the greatest impact per unit surface area. The spraying may take place, for example, at a spraying pressure of between 1 and 5 bar, preferably at about 3 bar. The spraying has a duration which depends on the amount of polymer to be treated.

When a rinsing step using a rinsing liquid, for example water, is envisaged, it is also performed by spraying using the same spraying nozzle as that used for the aqueous solution comprising at least one heat stabilizer. The rinsing step may be consecutive to the step of placing the polyamide granules in contact with the aqueous solution comprising at least one heat stabilizer. Preferably, the spraying of the rinsing solution takes place less than one minute after that of the aqueous solution comprising at least one heat stabilizer.

The step of spraying of the aqueous solution comprising at least one heat stabilizer is preferably performed on granules that are kept stirring, for example using a paddle mixer. Any other mixer known to those skilled in the art may also be suitable for use.

The mixing (or stirring) and the spraying of the aqueous solution comprising at least one heat stabilizer advantageously begin simultaneously. The mixing of the granules may also begin before the start of spraying of the aqueous solution comprising at least one heat stabilizer. The duration of the spraying step is calculated so as to be compatible with renewal of the surface in contact with the sprayed aqueous solution. The renewal of the surface may be likened to a mixing time, i.e. the time required to obtain a desired degree of homogenization from a given situation of heterogeneity. This duration depends on the equipment used and may be readily defined by a person skilled in the art via routine tests.

The mixing speed depends on the volume of granules to be treated and also on the equipment used. A person skilled in the art knows perfectly how to adjust this parameter. Advantageously, the spraying of the aqueous solution comprising at least one heat stabilizer is performed on stirred granules, and the stirring is then continued. The stirring (or mixing) of the granules after spraying of the aqueous solution comprising at least one heat stabilizer lasts from 0.1 to 40 minutes and preferably from 5 to 30 minutes.

At room temperature, a mixing time after spraying of the aqueous solution of between 10 and 40 minutes and preferably between 15 and 30 minutes should generally be counted. When the temperature is above the glass transition temperature of the polyamide, the mixing time after spraying is generally from about 1 to 10 minutes and preferably from 2 to 5 minutes.

From a practical point of view, the process may be performed in a batch or continuous mode.

To illustrate the process of the invention, implementation examples are described below.

1) Polyamide 66 granules are placed under nitrogen in a paddle mixer under a stream of nitrogen, equipped with a spraying nozzle. The granules have a temperature of about 85° C. Stirring is started at a speed of 150 rpm and the aqueous solution comprising at least one heat stabilizer is then sprayed, using the spraying nozzle, at a pressure of 3 bar. After spraying of the aqueous solution comprising at least one heat stabilizer, the rinsing liquid is optionally sprayed and the granules are kept stirring at a speed of 150 rpm for 5 minutes. The granules thus supplemented are then discharged under cover of nitrogen.

2) Polyamide 66 granules are placed in a paddle mixer equipped with a spraying nozzle. The granules are at room temperature, of about 20° C. Stirring at a speed of 150 rpm and spraying of the aqueous solution comprising at least one heat stabilizer, using the spraying nozzle, at a pressure of 3 bar, are started simultaneously. After spraying of the aqueous solution comprising at least one heat stabilizer, the rinsing liquid is optionally sprayed and the granules are kept stirring at a speed of 150 rpm for 20 minutes. The granules thus supplemented are then discharged.

The granules thus supplemented may be used directly in a melt spinning process, preferably after having undergone a drying step.

According to an advantageous embodiment of the invention, the polyamide granules obtained after placing in contact with the single aqueous solution comprising at least one heat stabilizer are subjected directly to a solid-phase post-condensation step (PCS) which may be performed in continuous or batch mode.

This PCS step is advantageously performed under the following conditions: under a stream of nitrogen or at reduced pressure, and at a temperature of between 160 and 220° C. for the time necessary to reach the desired molar mass.

It should be noted that it is not necessary at this stage to perform a step of drying of the granules before PCS. This aspect has the advantage of limiting the thermal degradation that may arise on drying.

In accordance with the process of the invention, polyamide granules that are uniformly supplemented at their surface with a heat stabilizer are obtained. The term "at their surface" means that the heat stabilizer is just below the surface of the granules, i.e. the largest concentration of heat stabilizer is about 40 μm below the surface. Thus, the supplemented granules do not pose any problem during their handling which might give rise to a supplementation homogeneity defect, the appearance of fines and deteriorated behavior (breakage, defects) during spinning.

Furthermore, the granules thus obtained do not aggregate together.

In addition, such granules also satisfy the quality requirements both of polyamide yarns for the manufacture of airbag fabrics and of polyamide yarns for the manufacture of tire cord fabrics.

One of the particular features of the process of the invention is that the granules which have undergone a PCS step after supplementation are stabilized "at the core". There is no longer any concentration gradient of the heat stabilizer between the surface and the core of the granule. Such a granule therefore has, from the point of view of heat stabilization, the same characteristics as a granule supplemented on polymerization.

The heat resistance properties of industrial yarns obtained from the granules stabilized by the process of the invention are evaluated by measuring the toughness after having undergone an aging test.

The process according to the invention described above makes it possible to obtain polyamide granules that are uniformly supplemented at their surface with a heat stabilizer.

The process of the invention is particularly advantageous since it does not have the drawbacks of the prior art processes and especially the problem of granule aggregation and does not require a step of drying of the supplemented granules. It is also simple to perform in industrial installations and economically efficient since it is productive.

The process of the invention also has the advantage of providing granules that may be used both for the manufacture of polyamide yarns for airbag fabrics and for the manufacture of polyamide yarns for tire cord fabrics.

Furthermore, in its preferential mode in which the aqueous solution is free of alkali metal or alkaline-earth metal bromide, the process overcomes the phenomena of deposition of this bromide at the surface of the granules, especially as a function of the humidity of these granules. This phenomenon is unacceptable, especially in the field of airbags, since it leads to the formation of fines, which, during the PCS, form solid particles rich in heat stabilizer, giving rise to problems of poor behavior or defects on spinning.

The present invention is also directed toward the use of the polyamide granules thus obtained for the manufacture of industrial yarns, and the industrial yarns thus obtained. Other subjects of the invention are articles obtained from the industrial yarns according to the invention, especially woven articles such as airbag fabrics or tire cord fabrics.

Examples of implementation of the invention, which are given for illustrative purposes and with no limiting nature, are given below.

In the examples, the following abbreviations have the meanings as follows:

CuI: copper iodide, KI: potassium iodide
$CuBr_2$: copper bromide, KBr: potassium bromide; $AgNO_3$: silver nitrate
ICP: inductively coupled plasma; OES: optical emission spectrometry
EDX: energy-dispersive X-ray spectrometry
GC-SM: gas chromatography-small masses
CEG: concentration of carboxylic end groups
AEG: concentration of amine end groups

EXAMPLES

1—Preparation of Aqueous Solutions Comprising at Least One Heat Stabilizer 1.1—Single Solution of CuI/KI:

To prepare 200 g of a single aqueous solution of CuI/KI, use is made of a stirring mixer precleaned and rinsed with demineralized water, into which are placed 80 g of demineralized water and then 94.9 g of potassium iodide and the rest of 14.9 g of demineralized water. The mixture is stirred for 1 hour. The dissolution reaction is highly exothermic. 10.2 g of copper iodide are then added and the mixture is stirred for 20 minutes. The aqueous solution thus obtained is filtered and stored in a brown glass container.

The composition of the solution is checked by elemental analysis (potentiometry with $AgNO_3$ for iodine and ICP/OES for copper and potassium).

1.2—Single Solution of $CuBr_2$/KBr:

To prepare 200 g of a single aqueous solution of $CuBr_2$/KBr, use is made of a stirring mixer precleaned and rinsed with demineralized water, into which are placed 120 g of demineralized water and then 58 g of potassium bromide and the rest of 15.5 g of demineralized water. The mixture is stirred for 1 hour. The dissolution reaction is highly exothermic. 6.5 g of copper dibromide are then added and the mixture is stirred for 20 minutes. The aqueous solution thus obtained is filtered and stored in a brown glass container. The composition of the solution is checked by elemental analysis (potentiometry with $AgNO_3$ for bromine and ICP/OES for copper and potassium).

2—Preparation of the Polyamide Granules

A polyamide 6.6 is prepared from an aqueous solution of N salt at 52% by weight placed in an evaporator with external recirculation with 9 ppm of antifoam (silicone composition). The solution of N salt is concentrated by heating to 154.0° C. at a pressure of 0.24 MPa. At the end of the evaporation, the concentration of dissolved species in the solution is 85.0% by weight. This solution is then transferred into an autoclave. The autoclave is heated so as to obtain an autogenous pressure of 1.85 MPa. The polymerization phase under pressure lasts for 42 minutes, and the pressure is then gradually reduced to atmospheric pressure. The reactor is then maintained at atmospheric pressure for 20 minutes and the temperature reached by the reaction mass at the end of this step is 277° C. The reactor is then placed under a nitrogen pressure of between 0.4 and 0.5 MPa in order to allow the polymer to be extruded in the form of rods, which are cooled with water and cut so as to obtain granules.

The polyamide 6.6 obtained has a viscosity index of 134 mL/g measured in 90% formic acid, at a concentration of 0.5 g/100 mL. Its moisture content is 0.3% measured by Karl-Fischer and its particle size is 25 mg per particle.

The polyamide 6.6 obtained has a $\Delta(GT)=GTC-GTA=68.6-53.7=14.9$ mmol/kg.

3—Supplementation by Wet Impregnation

The wet impregnation tests on the granules are all performed in an MLH 12L horizontal mixer from MAP (WAM-GROUP) equipped with a jacket that can be heated or cooled, a stirring rotor of ploughshare type and a liquid injection system. The injection nozzle used is a Teejet nozzle with a flow rate of 0.1 L/min and a spraying angle of 50° at a pressure of 0.3 MPa.

To optimize the mixing, the mixer tank is filled to 60% of its volume, i.e. about 4.7 kg, with fresh polyamide. During impregnation on hot granules, the mixer jacket is preheated to 90° C.

The polymer granules are placed in the mixer tank, which is then rendered inert with nitrogen for 5 minutes, during which the stirring is started at 150 rpm. This value was chosen to optimize the mixing and to limit the abrasion of the granules. Next, the aqueous solution of heat stabilizers is injected by introducing the amount of solution required to obtain the desired amount. The liquid introduction system is set at a nitrogen pressure of 0.3 MPa and the valve connecting this lock chamber to the injection nozzle is opened. After 1 minute, the valve of the liquid introduction lock chamber is closed. The rinsing water is introduced into the lock chamber, which is then placed once again under a nitrogen pressure of 0.3 MPa so as to inject the rinsing water via the injection nozzle. At the end of this operation, the mixing time before stoppage of the stirring and emptying-out of the polyamide is counted down.

The supplementation conditions: granule temperatures, the type of heat stabilizers, the amounts of heat stabilizer solution and of rinsing water, the mixing time, are specified for the comparative examples in Table 1 and for the examples according to the invention in Table 2.

4—Summary Table of the Supplementation Conditions 4.1—Comparative Examples

1': total weight amount of aqueous solution/weight of polyamide=2%

2': total weight amount of aqueous solution/weight of polyamide=3%

TABLE 1

Comparative examples

| Comp. Ex. | | Type | Heat stabilizers (ppm) | | | | Solution Amount (g) | Rinsing Water (g) | T° C. Granules (° C.) | Stirring Speed (rpm) | Mixing Time (min) |
|---|---|---|---|---|---|---|---|---|---|---|---|
| | | | Cu | Br | I | K | | | | | |
| 1' | a | CuI/KI | 60 | 0 | 1400 | 393 | 16.6 | 77.4 | 20 | 150 | 5 |
| | b | | | | | | | | | | 15 |
| | c | | | | | | | | | | 30 |
| 2' | a | CuI/KI | 60 | 0 | 1400 | 393 | 16.6 | 124.4 | 20 | 150 | 5 |
| | b | | | | | | | | | | 15 |
| | c | | | | | | | | | | 30 |

4.2—Examples According to the Invention: Amount of Aq. Sol.=1% Max

1: total weight amount of aqueous solution/weight of polyamide=1%
2: total weight amount of aqueous solution/weight of polyamide=1%

TABLE 2

Examples according to the invention

| Ex. | | Type | Heat stabilizers (ppm) | | | | Solution Amount g | Rinsing Water g | T Granules (° C.) | Stirring Speed (rpm) | Mixing Time (min) |
|---|---|---|---|---|---|---|---|---|---|---|---|
| | | | Cu | Br | I | K | | | | | |
| 1 | a | CuI/ | 60 | 0 | 1400 | 393 | 16.6 | 30.4 | 20 | 150 | 5 |
| | b | KI | | | | | | | | | 15 |
| | c | | | | | | | | | | 30 |
| | d | | | | | | | | 90 | | 5 |
| | e | | | | | | | | | | 15 |
| | f | | | | | | | | | | 30 |
| 2 | a | CuBr$_2$/ | 60 | 1400 | 0 | 646 | 30.28 | 16.72 | 20 | 150 | 5 |
| | b | KBr | | | | | | | | | 15 |
| | c | | | | | | | | | | 30 |
| | d | | | | | | | | 90 | | 5 |
| | e | | | | | | | | | | 15 |
| | f | | | | | | | | | | 30 |

5—Results 5.1. The Granules
Description of the Tests and Measurements Performed on the Supplemented Granules
Assay of the Copper and Potassium by ICP 0.5 g of polyamide granules is placed in a Parr bomb with 5 ml of nitric acid. Mineralization of the polyamide takes place in a microwave oven. At the end of mineralization, the material is recovered with water and transferred into a 50 ml flask made up with water.

The copper and potassium are assayed by ICP/OES with external calibration in 10 vol % HNO$_3$ medium.

Assay of the Iodine and Bromine by Argentimetry

Weigh out exactly 0.5 g of polyamide granules, 2 g of 0.06 M sodium sulfite solution and 6 g of osmosed water and then add 50 ml of formic acid at 90% by weight. Allow the mixture to dissolve with stirring for about 1 hour. When the polyamide is dissolved, add 8 g of water. The potentiometric assay of the iodine and bromine is performed with a 0.02 M silver nitrate (AgNO$_3$) solution.

Scanning Electron Microscopy Analyses

For the analyses of the surface state of the granules, two granules are bonded to a carbon pellet and then metallized with platinum.

To observe the interior of the granule, two granules are included in an Araldite® epoxy resin (to facilitate their handling) and are then levelled off with a knife. These slices are bonded to a carbon pellet and then metallized with platinum.

The various preparations are observed with a scanning electron microscope (SEM) at 15 kV with EDX analysis.

Thermal Degradation by UV Spectrophotometry 0.8 g of polyamide granules is added to 20 ml of a trifluoroethanol/chloroform mixture (10/3 by volume) The mixture is allowed to dissolve with stirring for about 1 hour. The solution is then transferred into a quartz cuvette and placed in the spectrometer for acquisition of the spectrum between 600 and 240 nm. The UV indices are calculated for the peaks at about 285 and 330 nm.

Comparative Table of Results

TABLE 3

Results of the comparative examples

| Comparative examples | Type | Additives Heat stabilizers (ppm) | | | | Thermal degradation | | Microscopy Presence of crystals at the surface |
|---|---|---|---|---|---|---|---|---|
| | | Cu | Br | I | K | UV 330 | UV 285 | |
| 1' a | CuI/ | 55 | | 1290 | 360 | 0 | 0 | no |
| b | KI | 56 | | 1300 | 360 | | | |
| c | | 56 | | 1310 | 370 | | | |
| 2' a | CuI/ | 48 | | 1115 | 315 | 0 | 0 | no |
| b | KI | 50 | | 1120 | 320 | | | |
| c | | 49 | | 1120 | 320 | | | |

TABLE 4

Results of the examples according to the invention

| Examples | Type | Additives Heat stabilizers (ppm) | | | | Thermal degradation | | Microscopy Presence of crystals at the surface |
|---|---|---|---|---|---|---|---|---|
| | | Cu | Br | I | K | UV 330 | UV 285 | |
| 1 a | CuI/KI | 57 | | 1340 | 360 | 0 | 0 | no |
| b | | 57 | | 1360 | 370 | | | |
| c | | 58 | | 1370 | 370 | | | |
| d | | 56 | | 1370 | 400 | | | |
| e | | 57 | | 1370 | 390 | | | |
| f | | 58 | | 1370 | 380 | | | |
| 2 a | CuBr$_2$/KBr | 55 | 1152 | | 475 | 0 | 0 | yes |
| b | | 55 | 1172 | | 530 | | | |
| c | | 55 | 1195 | | 518 | | | |
| d | | 56 | 1135 | | 447 | | | |
| e | | 57 | 1077 | | 463 | | | |
| f | | 56 | 1097 | | 441 | | | |

CONCLUSIONS

The results of the granule impregnation tests performed with 2% of aqueous solution relative to the weight of granules (Ex. 1') show a slight lack of additive relative to the target and a lack of homogeneity. Furthermore, slight aggregation of the granules with each other and on the wall of the mixer appears, which does not facilitate the handling.

The results of the granule impregnation tests performed with 3% of aqueous solution relative to the weight of granules (Ex. 2') show a real lack of additive relative to the target (~20%) and high heterogeneity. Furthermore, substantial aggregation of the granules with each other and on the wall of the mixer appears, which makes them difficult to handle.

The results of the granule impregnation tests performed with the CuI/KI solution at 1% max of aqueous solution relative to the weight of granule (Ex. 1) are at the target and homogeneous. During the impregnation at room temperature, it is preferable to mix for 15 minutes in order to have the same homogeneity as after 5 minutes at 90° C.

From the results of the granule impregnation tests performed with the CuBr$_2$/KBr solution (Ex. 2), the presence of KBr crystals is observed at the surface of the granules.

In all cases, the impregnation of the granules performed at 90° C. does not lead to any specific thermal degradation of the polymer and a gradient of heat-stabilizing elements below the surface of the granules is observed.

5.2. The Yarns
Description of the Post-Treatments Performed
Solid-State Post-Condensation In order to sufficiently increase the number-average molecular mass of the polymers, a solid-state post-condensation step is performed on each 4.7 kg batch of late-supplemented polymer. This solid-state post-condensation is performed in a 50 L rotary evaporator. The granules are heated to 195° C. under 500 L/h of nitrogen for 270 minutes.

Spinning—Drawing

The post-condensed polymer is spun and then drawn under standard conditions for industrial yarns so as to obtain 940/136 yarns.

Description of the Tests and Measurements Performed on the Yarns

The yarns undergo thermal aging in an oven at 165° C. for 168 hours under forced air ventilation.

The samples of yarns before and after aging are subjected to mechanical tests on a standard tensile testing machine in order to determine the losses of toughness, breaking stress and elongation at break after aging. The tests are performed at a speed of 500 mm/min with a distance between the jaws of 200 mm and a pretension of 300 g. The percentage loss for the viscosity index is also measured, the viscosity indices being measured as a 0.5% solution in 90% formic acid. The results of the percentage loss of the measured parameters are reported in Table 6 below.

In order to compare the impact of the late supplementation of heat stabilizers on the thermal degradation of the granules during the solid post-condensation and of the yarns during spinning and drawing and on the mechanical properties of the yarns after aging, a polymer for industrial yarns with addition of the heat stabilizers during the polymerization step was used as reference (cf. Table 5 below). This polymer is stabilized with aqueous solutions of copper acetate, potassium bromide and potassium iodide and was produced with the same industrial process and in the same reactor as the fresh polymer used for the late supplementation.

TABLE 5

Results of characterization of the granules after solid post-condensation

| Examples | Type | Heat stabilizers (ppm) | | | | Viscosity IV mL/g | Thermal degradation | |
| --- | --- | --- | --- | --- | --- | --- | --- | --- |
| | | Cu | Br | I | K | | UV 330 | UV 285 |
| Comparative 1 | CuBrI | 59 | 406 | 924 | 470 | 180 | + | ++ |
| c | CuI/KI | 59 | | 1399 | 380 | 180 | + | ++ |
| d | | 56 | | 1395 | 380 | 180 | + | ++ |
| f | | 57 | | 1408 | 390 | 178 | + | ++ |

TABLE 6

Results of characterization of the yarns after the aging test

| Measurement | Comparative | 1 c | 1 d | 1 f |
| --- | --- | --- | --- | --- |
| Breaking stress (percentage loss) | 27.1% | 24.4% | 24.7% | 24.2% |
| Elongation at break (percentage loss) | 18.5% | 11.0% | 11.3% | 10.6% |
| Toughness (percentage loss) | 27.1% | 24.4% | 24.7% | 24.1% |
| IVN (percentage loss) | 3.2% | 1.8% | 1.7% | 1.9% |

It is observed that the degradation of the mechanical properties of the yarns after aging is lesser for the yarns obtained using the process according to the invention than for the yarns obtained using the process of the comparative example.

Similarly, the reduction in viscosity index of the yarns obtained using the process according to the invention is lesser than that of the yarns according to the comparative example.

CONCLUSIONS

The granules supplemented according to the process of the invention behave in the same manner as the reference stabilized on polymerization during the solid post-condensation phase and do not show any different thermal degradation. No loss of heat stabilizers is observed after the solid post-condensation phase.

The aging tests on yarns show less degradation of the mechanical properties of the yarns obtained using the process according to the invention.

The invention claimed is:

1. A process for preparing polyamide granules with heat resistance properties, comprising:
    contacting the polyamide granules with a single aqueous solution comprising at least one heat stabilizer under a controlled atmosphere of inert gas, wherein the contacting is performed on stirred granules;
    wherein a total amount of an aqueous solution relative to the polyamide granules is less than or equal to 1% by weight; and
    wherein the heat stabilizer is a mixture of alkali metal or alkaline-earth metal halide and of copper halide; and
    subjecting the polyamide granules comprising the heat stabilizer to a solid-phase post-condensation step, without drying the polyamide granules before the solid-phase post-condensation step.

2. The process as claimed in claim 1, wherein the alkali metal halide is potassium or sodium iodide.

3. The process as claimed in claim 1, wherein the copper halide is copper iodide.

4. The process as claimed in claim 1, wherein the heat stabilizer is a mixture of potassium iodide and copper iodide.

5. The process as claimed in claim 1, wherein the ratio between the number of moles of halide and the number of moles of copper is greater than or equal to 7/1.

6. The process as claimed in claim 4, wherein the copper iodide is present in an amount of less than or equal to 6% by weight in the single aqueous solution of potassium iodide at 50% by weight.

7. The process as claimed in claim 1, further comprising performing a step of rinsing the polyamide granules with water after contacting the polyamide granules with the single aqueous solution.

8. The process as claimed in claim 1, wherein the total amount of the aqueous solution relative to the polyamide granules is between 0.15% and 1% by weight.

9. The process as claimed in claim 1, wherein the polyamide in the polyamide granules is polyamide 66.

10. The process as claimed in claim 1, wherein the contacting of the polyamide granules with the single aqueous solution is performed by spraying of the single aqueous solution.

11. The process as claimed in claim 7, wherein the total amount of the aqueous solution relative to the polyamide granules includes the amounts of the single aqueous solution and the water from the rinsing step.

* * * * *

UNITED STATES PATENT AND TRADEMARK OFFICE
CERTIFICATE OF CORRECTION

PATENT NO. : 10,683,407 B2
APPLICATION NO. : 14/363595
DATED : June 16, 2020
INVENTOR(S) : Thieblemont It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1238 days.

Signed and Sealed this
Thirty-first Day of January, 2023

Katherine Kelly Vidal
*Director of the United States Patent and Trademark Office*